United States Patent
Clarke et al.

(10) Patent No.: US 7,033,696 B2
(45) Date of Patent: Apr. 25, 2006

(54) ELECTRIC DEVICES WITH IMPROVED BIPOLAR ELECTRODE

(75) Inventors: Robert Lewis Clarke, Orinda, CA (US); Brian J. Dougherty, Menlo Park, CA (US); Stephen Harrison, Shawinigan (CA); J. Peter Millington, Chesire (GB); Samaresh Mohanta, Fremont, CA (US); Bernd Busse, Darmstadt (DE)

(73) Assignee: Plurion Systems, Inc., Reno, NV (US)

( * ) Notice: Subject to any disclaimer, the term of this patent is extended or adjusted under 35 U.S.C. 154(b) by 470 days.

(21) Appl. No.: 10/366,118

(22) Filed: Feb. 12, 2003

(65) Prior Publication Data

US 2003/0162087 A1    Aug. 28, 2003

Related U.S. Application Data

(60) Provisional application No. 60/357,678, filed on Feb. 12, 2002.

(51) Int. Cl.
  *H01M 6/48*   (2006.01)
  *H01M 4/36*   (2006.01)
  *H01M 4/62*   (2006.01)
  *H01M 6/04*   (2006.01)

(52) U.S. Cl. .................. 429/210; 429/105; 429/232; 429/347

(58) Field of Classification Search ............... 429/210, 429/105, 347, 232, 231.5, 128
See application file for complete search history.

(56) References Cited

U.S. PATENT DOCUMENTS

| 4,235,695 | A | * | 11/1980 | De Nora et al. ............ 204/268 |
| 4,422,917 | A | * | 12/1983 | Hayfield ................. 204/196.01 |
| 4,971,666 | A | * | 11/1990 | Weinberg et al. ........... 205/334 |
| 5,173,215 | A | * | 12/1992 | Clarke ........................ 423/608 |
| 5,264,305 | A | * | 11/1993 | Charkey ..................... 429/152 |
| 5,281,496 | A | * | 1/1994 | Clarke ..................... 429/218.1 |
| 5,681,445 | A | * | 10/1997 | Harrison et al. ............ 205/445 |

* cited by examiner

*Primary Examiner*—Patrick Joseph Ryan
*Assistant Examiner*—Thomas H. Parsons
(74) *Attorney, Agent, or Firm*—Rutan & Tucker, LLP

(57) ABSTRACT

An electric device has a plurality of cells in which in an acid electrolyte a lanthanide and zinc form a redox couple that provide a current, and in which at least two of the cells are separated by a bipolar electrode that comprises a glassy carbon or a Magneli phase titanium suboxide.

15 Claims, 1 Drawing Sheet

ELECTRIC DEVICES WITH IMPROVED BIPOLAR ELECTRODE

This application claims the benefit of U.S. provisional application No. with the Ser. No. 60/357,678, filed Feb. 12, 2002, and incorporated herein by reference.

FIELD OF THE INVENTION

The field of the invention is electric devices, and especially batteries.

BACKGROUND OF THE INVENTION

Numerous types and configurations for secondary batteries have been developed to improve various aspects of energy storage, and particularly the ratio of weight or volume to capacity. Among various alternative configurations, cell stacks in which bipolar electrodes separating anode from cathode compartments have held considerable promise in the reduction of cell size, and there are numerous such systems known in the art.

For example, U.S. Pat. No. 5,264,305 describes a cell system in which zinc is used as one redox element, and in which a bipolar plate construction with horizontally disposed battery components provides electrical current. While such configurations are typically less space-consuming than conventional zinc-based configurations, several disadvantages still persist. Among other problems, the ratio of weight or volume to capacity is still relatively poor.

In another example, bipolar electrodes may be employed in zinc air batteries as described in "Bipolar zinc-air secondary battery" by C. Schlatter, Ch. Comninellis, 45th annual meeting of ISE, Porto, Portugal, Proc. VII-109, Vol. 2, (1994). While the use of a zinc air couple significantly reduces the weight on such batteries, oxidation problems of the membranes, and particularly deposit formation are relatively common.

To circumvent at least some of the problems with limited capacity and oxidative damage of bipolar electrodes, zinc bromine systems have been implemented in which zinc and bromine form a redox couple, and in which a bipolar electrode separates anode and cathode compartments. Such batteries are known to exhibit a 2–3 fold increased power density when compared to traditional lead-acid batteries. Moreover, the capacity is typically only limited by the amount of catholyte and anolyte. However, the corrosive nature of bromine tends to limit the range of materials from which bipolar electrodes may be manufactured. Furthermore, such systems are environmentally problematic during manufacture, maintenance, and disposal.

In still other battery systems with bipolar electrodes, and especially where the electrolyte is an acidic electrolyte, additional problems arise. Typically, carbon or graphite electrodes are readily oxidized under standard operating conditions. Consequently, most, if not all of such systems require development and implementation of composite bipolar electrodes, which significantly tends to increase production cost. Moreover, at least some of those systems require additional catalyst to promote oxidation of one of the elements in the redox couple.

Thus, although there are numerous electric devices with bipolar electrodes known in the art, all or almost all of them suffer from one or more disadvantage. Therefore, there is still a need to provide compositions and methods for electric devices with improved bipolar electrodes.

SUMMARY OF THE INVENTION

The present invention is directed to electric devices, and especially secondary batteries, in which a plurality of cells are separated by a bipolar electrode. It is especially preferred that such devices include an acid electrolyte in which a first and second element form a redox couple that provides a current.

Thus, in one especially preferred aspect of the inventive subject matter, an electric device includes a bipolar electrode separating a first cell from a second cell, wherein at least one of the first and second cells comprises an acid electrolyte in which a first element and a second element form a redox couple, wherein oxidation of the first element and reduction of the second element provide a current, and wherein the bipolar electrode comprises a glassy carbon or a Magneli phase titanium suboxide.

In another especially preferred aspect of the inventive subject matter, a secondary battery comprising a plurality of cells in which in an acid electrolyte a lanthanide and zinc form a redox couple that provide current of the battery, and in which at least two of the plurality of cells are separated by a bipolar electrode that comprises a glassy carbon or a Magneli phase titanium suboxide.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
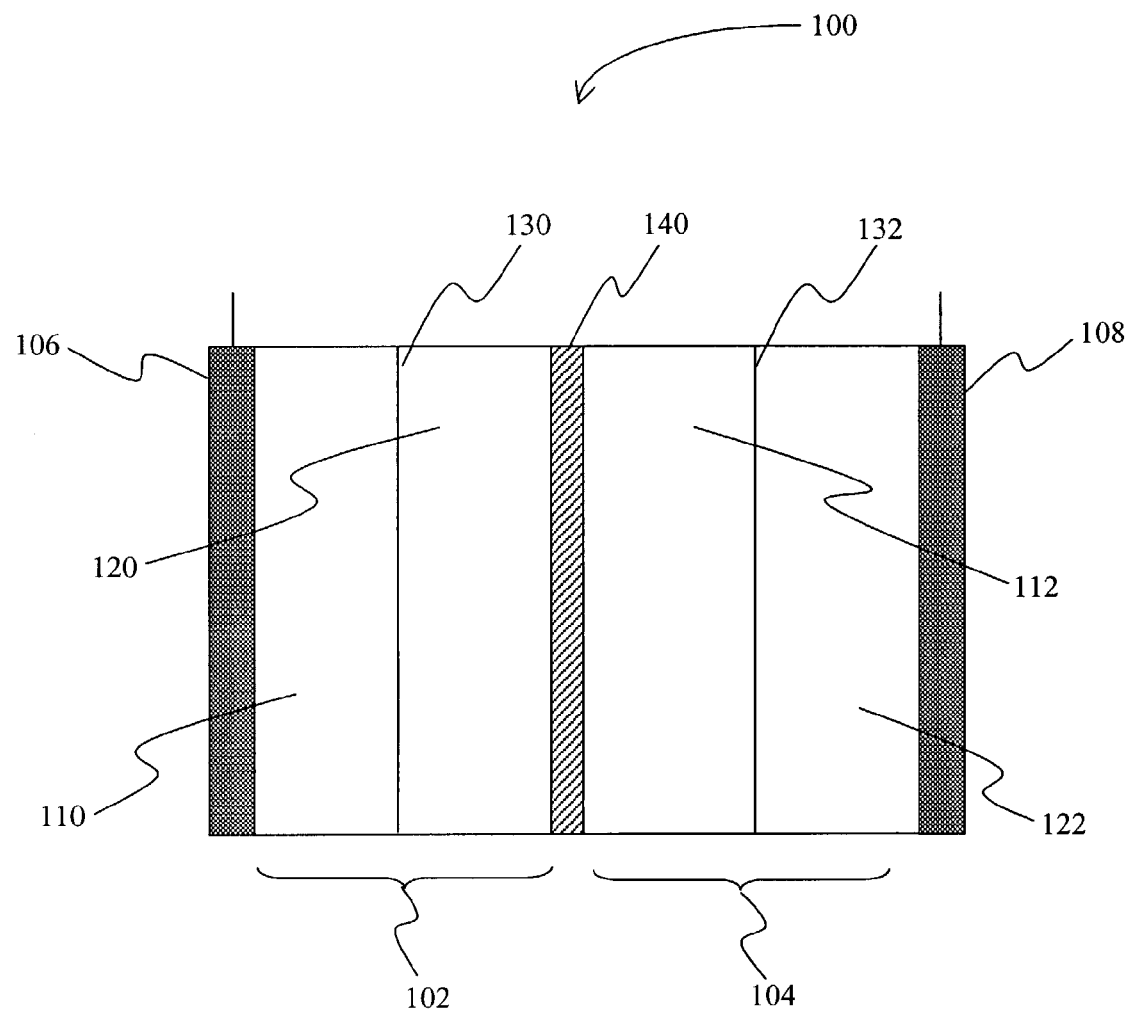
FIG. 1 is an exemplary schematic depiction of a secondary battery with an improved bipolar electrode according to the inventive subject matter.

The inventors have discovered that an electric device, and especially a secondary battery may be produced in which a first metal (e.g., zinc) and a second metal (e.g., cerium) form a redox pair in an acidic electrolyte (e.g., methane sulfonic acid or nitric acid), and in which a corrosion resistant bipolar electrode separates a cathode compartment from an anode compartment. Particularly preferred corrosion resistant bipolar electrodes include those in which at least part of the bipolar electrode comprises glassy carbon or other material in which carbon has no long-range order in three dimensions, or EBONEX™ (substoichiometric oxides of titanium having the formula of $Ti_nO_{2n-1}$ where n is an integer of 4 or more; for example, commercially available from Atraverda, Mansfield, UK), which may or may not be further modified (e.g., platinized, or niobium-doped).

As used herein, the term "redox pair" is interchangeably used with the term "redox couple" and refers to a combination of a first element (or ion of the first element) and second element (or ion of the second element) in a battery, in which reduction of the first element and oxidation of the second element produce the current provided by the battery. First and second elements are typically metals (and may be in ionic form where appropriate), however, it should be recognized that other elements, and especially oxygen is also included in the definition of suitable elements. As also used herein, the term "corrosion resistant bipolar electrode" refers to a bipolar electrode that maintains performance (i.e., loss of capacity of no more than 10%) of a secondary battery over 50 charge-discharge cycles where the bipolar electrode is placed in an acidic electrolyte.

As further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

In a particularly preferred battery configuration, the redox couple is formed by zinc and cerium in an acidic electrolyte in which methane sulfonic acid provides the acid and further complexes cerium and/or zinc. FIG. 1 illustrates an exemplary battery with an improved bipolar electrode, wherein the bipolar electrode is fabricated from glassy carbon. Here, battery 100 has a first cell 102 with a first anode compartment 110 and a first cathode compartment 120, wherein the first anode compartment is separated from the adjacent first cathode compartment by a first separator 130. A second cell 104 adjacent and in electrical contact with the first cell is separated from the first cell 102 by a bipolar electrode 140. The second cell 104 has a second anode compartment 112 and a second cathode compartment 122, wherein the second anode compartment is separated from the adjacent second cathode compartment by a second separator 132. Terminal electrodes 106 and 108 provide the current from the redox reaction between the first and second element in the electrolyte.

The redox couple is preferably formed by zinc and cerium in an acidic electrolyte. Based on previous experiments, such redox couples typically have an open circuit voltage of at least 2.4 Volt, and more typically 2.46 Volt, which is superior to numerous other redox couples. In such configurations, the inventors contemplate that zinc will be dissolved into solution on discharge of the battery and plated onto one side of the bipolar electrode during charging following the equation (I) below. On the other side of the bipolar electrode, cerium ions will donate/receive electrons following the equation (II) below.

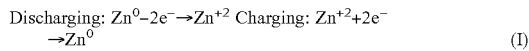

Discharging: $Zn^0 - 2e^- \rightarrow Zn^{+2}$ Charging: $Zn^{+2} + 2e^- \rightarrow Zn^0$     (I)

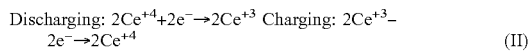

Discharging: $2Ce^{+4} + 2e^- \rightarrow 2Ce^{+3}$ Charging: $2Ce^{+3} - 2e^- \rightarrow 2Ce^{+4}$     (II)

Contemplated batteries will advantageously employ an acid electrolyte, and especially preferred acid electrolytes include organic acids. It is further generally preferred that contemplated organic acids (a) have a relatively high solubility in aqueous or non-aqueous medium, and (b) can complex (e.g., via salt formation) or otherwise bind at least one element (in ionic form) of the redox couple to retain the element in the solution or medium. Particularly preferred organic acids include those that are able to dissolve ceric ions, cerous ions and zinc ions at a relatively high concentration (e.g., greater than 0.2M, more preferably greater than 0.5M, and most preferably greater than 0.7M), and an especially suitable organic acid is methane sulfonic acid (MSA). However, alternative organic acids also include trifluoromethane sulfonic acid ($CF_3SO_3H$), which is thought to make a better solvent anion than methane sulfonic acid for ceric ions. Still further contemplated acids also include inorganic acids such as perchloric acid ($HClO_4$), nitric acid, hydrochloric acid (HCl), or sulfuric acid ($H_2SO_4$).

Further advantageous aspects of such batteries are described in co-pending international patent applications with the serial numbers PCT/US01/41678 (filed Aug. 10, 2001), PCT/US02/04749 (filed Feb. 12, 2002), PCT/US02/04740 (filed Feb. 12, 2002), PCT/US02/04738 (filed Feb. 12, 2002), PCT/US02/04748 (filed Feb. 12, 2002), and PCT/US02/20522 (filed Jun. 25, 2002), all of which are incorporated by reference herein.

With respect to the material of contemplated bipolar electrodes it is generally contemplated that all materials are suitable that (a) promote oxidation of an element (and preferably a lanthanide) in acidic solution, and (b) are not degraded/oxidized by the element in acidic solution. In one particularly preferred aspect, suitable bipolar electrodes comprise carbon-containing materials in which the carbon has no long-range order in three dimensions. Consequently, particularly contemplated materials include fullerenes (of up to 540 carbon atoms, and more), glassy carbon (commercially available in various forms, including powdered, foamed, or sheets), and diamonds.

Where contemplated bipolar electrodes include carbon with no long-range order in three dimensions, it is generally contemplated that the bipolar electrode may substantially consist of(ie., more than 90% of the electrode volume), or include such materials. For example, suitable bipolar electrodes may be formed from high-temperature fired foamed glassy carbon or sheets otT glassy carbon (commercially available from Destech, Tucson, Ariz.). Alternatively, electrically conductive glassy carbon may also be (partially and/or entirely) embedded into a carrier substrate. Particularly suitable carrier substrates include conductive acid resistant polymers, and all known conductive and acid resistant polymer compositions are considered suitable for use herein. Exemplary compositions for such conductive polymers can be found in U.S. Pat. Nos. 4,237,441 to van Konynenburg et al., 4,388,607 to Toy et al., 4,534,889 to van Konynenburg et al., 4,545,926 to Fouts et al., 4,560,498 to Horsma et al., 4,591,700 to Sopory, 4,724,417 to Au et al., 4,774,024 to Deep et al., 4,935,156 to van Konynenburg et al., 5,049,850 to Evans et al., and 5,250,228 to Baigrie et al. (all of which are incorporated by reference herein). Embedding of the carbon with no long-range order (e.g., fullerenes, fired glassy carbon, etc.) may be done in numerous manners. However, it is generally preferred that embedding is performed via pressing the carbon into the conductive sheet or material (which may further include a step of heating).

Further especially preferred bipolar electrodes may also include Magneli phase titanium suboxide, which may be present in various forms. For example, suitable electrodes may include Magneli phase titanium powders that are pressed into the conductive polymer. Of course, it should be recognized that where the bipolar electrode includes a Magneli phase titanium suboxide, such material may further include electrocatalytic materials. For example, Magneli phase titanium suboxide may be formed into mini electrodes (e.g., in form of small tiles of 1 cm square and 1 mm thick) that are coated with platinum and subsequently hot pressed into conductive plastic sheets previously filled with carbon or powdered conductive metals. In such configurations, only part of the powdered particles or mini tiles is exposed to the electrolyte, while another part is buried below the surface of the conductive plastic, and the platinum catalyzed ceramic acts as the electrode whereas the conductive plastic is the connecting substrate.

Of course, it should be recognized that suitable materials for bipolar electrodes may be present in various forms on a carrier material. For example, where such materials are relatively expensive (e.g., diamonds), diamond dust may coat the surface of the carrier material. Alternatively, where a relatively high surface is desirable, foamed glassy carbon may be employed. On the other hand, where a polished surface is particularly important (e.g., where polishing is part of surface maintenance), suitable materials may be formed as sheets or in multiple layers of sheets.

Still further, it should be recognized that contemplated bipolar electrode materials may make up only a portion of the electrically active surface or may form the entire electrically active surface. Similarly, it is preferred that all bipolar electrodes in a cell stack will comprise at least a portion containing contemplated materials. However, where desirable, only selected bipolar electrodes may include contemplated materials.

Thus, especially preferred electric devices include secondary batteries in which the acid electrolyte comprises an organic acid (most preferably methane sulfonic acid), in which the first metal comprises a lanthanide (e.g., cerium, praseodymium, neodymium, terbium, and dysprosium), and the second metal comprises zinc or titanium. Furthermore, preferred devices also include lead-acid batteries and fuel cells with acidic electrolyte.

EXPERIMENTS

Secondary Battery with Glassy Carbon Bipolar Electrode

To validate the concept of a glassy carbon bipolar electrode, a rechargeable battery was manufactured comprising an electrolyte that includes a cerium-zinc redox pair. A series of cells was constructed by using blocks of plastic Ultra High Molecular Weight Polyethylene (UHMWP), with gaskets in between each face, two terminal electrodes, and one glassy carbon bipolar electrode (Destech Corporation, 1664 S. Research Loop, Suite 200, Tucson, Ariz. 85710). Electrolyte inlets and outlets were made in the center sections and electrolyte was fed from two small tanks via a peristaltic pump into the respective compartments.

The cerium solution contained 106 grams $Ce_2(CO_3)_3$ *$5H_2O$ in 480 ml methane sulfonic acid and 320 ml of water. The zinc solution contained 65 grams zinc carbonate in 240 ml methane sulfonic acid and 160 ml of water. The ceric solution was fed to the cathode compartments (Cathode was coated titanium mesh), and the zinc solution was fed to the anode compartments (Anode was titanium mesh). Cell gap was between the electrodes was 2.54 cm, at a flow rate of about 2 liter per minute.

The cell stack was charged at 0.5 A (current density is 50 $mA/cm^2$) for several hours, during which the colorless cerous methane sulfonate turned yellow in all cathode compartments. The color change in the cathode compartments indicated oxidation of the cerium $3^+$ to cerium $4^+$ by the glassy carbon electrode without use of a catalyst. Furthermore, oxidation of cerium $3^+$ was consistent through several cycles without apparent deterioration in the charge or discharge cycles. Remarkably, there was also no apparent oxidative change in the glassy carbon electrode surface, indicating the despite the unfavorable reduction potential of carbon to cerium $3^+$ the glassy carbon remained substantially unaffected over the entire test period. Moreover, repeated charge of the cell stack led to repeated and consistent plating of zinc on the cathode side of the glassy carbon membrane, thereby clearly indicating the usefulness of glassy carbon as a bipolar electrode in secondary batteries with acid electrolyte.

Secondary Battery with Composite Bipolar Electrode Made from Magneli Phase Titanium Suboxide and Conductive Plastic Sheet Magneli phase titanium suboxide powder with a particle size in the range of 50–500 microns diameter was treated with a solution of the following: 30 grams of chloroplatinic acid dispersed in 50 mls of n-propanol reacted and 30 mls of eugenol. The mixture was refluxed for 2 hours at 90° C. The resulting organometallic compound was used to treat samples of Magneli phase titanium suboxide to give 4 different loadings of platinum. The ceramic material was dried in an oven at 100° C. to drive off solvent. The temperature was then raised to 395° C. for 15 minutes. Examination under a low powered microscope showed that the ceramic particles were covered with what appeared to be platinum metal.

Samples of this powder were hot pressed into the surface of carbon filled high-density polyethylene thermoplastic, such that at least 50% of the volume of each particle was exposed. These electrodes were placed in the battery electrolyte and performed as an anode with lower overvoltage compared to a conventional platinized titanium electrode. This was probably due to the higher true surface area created by the Magneli phase titanium suboxide, which is known to have a much higher true surface area than a titanium sheet.

Thus, specific embodiments and applications of electric devices with an improved bipolar electrode have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery comprising:
   a bipolar electrode separating a first cell from a second cell, wherein at least one of the first and second cells comprises an acid electrolyte in which a first element and a second element form a redox couple;
   wherein oxidation of the first element and reduction of the second element provide a current of the battery; and
   wherein the bipolar electrode comprises a glassy carbon or a Magneli phase titanium suboxide.

2. The electric device of claim 1 wherein the acid electrolyte comprises an organic acid.

3. The electric device of claim 1 wherein the acid electrolyte comprises methane sulfonic acid or nitric acid.

4. The electric device of claim 3 wherein the first element is zinc.

5. The electric device of claim 4 wherein the second element is cerium.

6. The electric device of claim 1 wherein the second element is a lanthanide.

7. The electric device of claim 1 wherein the bipolar electrode comprises a glassy carbon that is at least partially embedded into a conductive polymer.

8. The electric device of claim 1 wherein the bipolar electrode comprises a Magneli phase titanium suboxide that is at least partially embedded into a conductive polymer.

9. The electric device of claim 1 wherein the Magneli phase titanium suboxide further comprises platinum or niobium.

10. The electric device of claim 1 wherein the bipolar electrode comprises a glassy carbon that is at least partially embedded into a conductive polymer.

11. The electric device of claim 1 wherein the bipolar electrode comprises a Magneli phase titanium suboxide that is at least partially embedded into a conductive polymer.

12. The electric device of claim 1 wherein the Magneli phase titanium suboxide further comprises platinum or niobium.

13. A secondary battery that comprises a plurality of cells in which in an acid electrolyte a lanthanide and zinc form a redox couple that provide current of the battery, and in which at least two of the plurality of cells are separated by a bipolar electrode that comprises a glassy carbon or a Magneli phase titanium suboxide.

14. The secondary battery of clam 13 wherein the lanthanide is cerium.

15. The secondary battery of clam 14 wherein the acid electrolyte comprises methane sulfonic acid or nitric acid.

* * * * *